United States Patent
Ito et al.

(10) Patent No.: US 12,353,614 B2
(45) Date of Patent: Jul. 8, 2025

(54) WEARABLE TERMINAL APPARATUS, PROGRAM, DISPLAY METHOD, AND VIRTUAL IMAGE DISTRIBUTION SYSTEM

(71) Applicant: KYOCERA Corporation, Kyoto (JP)

(72) Inventors: Shingo Ito, Kyoto (JP); Tomokazu Adachi, Yokohama (JP); Kai Shimizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/571,584

(22) PCT Filed: Jun. 25, 2021

(86) PCT No.: PCT/JP2021/024081
§ 371 (c)(1),
(2) Date: Dec. 18, 2023

(87) PCT Pub. No.: WO2022/269888
PCT Pub. Date: Dec. 29, 2022

(65) Prior Publication Data
US 2024/0288931 A1    Aug. 29, 2024

(51) Int. Cl.
*G06F 3/01* (2006.01)
*G02B 27/01* (2006.01)
*G06F 40/58* (2020.01)

(52) U.S. Cl.
CPC .......... *G06F 3/011* (2013.01); *G02B 27/0101* (2013.01); *G02B 27/017* (2013.01); *G06F 40/58* (2020.01); *G02B 2027/0138* (2013.01); *G02B 2027/014* (2013.01); *G02B 2027/0141* (2013.01)

(58) Field of Classification Search
CPC . G06F 3/011; G06F 3/01; G06F 40/58; G02B 27/0101; G02B 27/017; G02B 2027/0138; G02B 2027/014; G02B 2027/0141
See application file for complete search history.

(56) References Cited

U.S. PATENT DOCUMENTS

| | | | |
|---|---|---|---|
| 2018/0300952 A1* | 10/2018 | Evans | G06F 9/453 |
| 2019/0068529 A1* | 2/2019 | Mullins | G06T 19/006 |
| 2019/0087021 A1 | 3/2019 | Balan et al. | |
| 2019/0340822 A1 | 11/2019 | Ernst et al. | |
| 2019/0371279 A1* | 12/2019 | Mak | G09G 5/373 |
| 2021/0165484 A1 | 6/2021 | Suguhara et al. | |

FOREIGN PATENT DOCUMENTS

| | | | |
|---|---|---|---|
| CN | 203858414 U | | 10/2014 |
| JP | 2021043476 A | * | 3/2021 |
| WO | 2020/039933 A1 | | 2/2020 |

* cited by examiner

*Primary Examiner* — Brent D Castiaux
(74) *Attorney, Agent, or Firm* — Studebaker Brackett PLLC

(57) ABSTRACT

A wearable terminal apparatus to be worn by a user for use includes at least one processor. The at least one processor causes a display unit to display a virtual image of a polyhedron located in a space. The at least one processor causes a first image having first information to be displayed on a first surface of the polyhedron and causes a second image having second information to be displayed on a second surface of the polyhedron.

21 Claims, 10 Drawing Sheets

WEARABLE TERMINAL APPARATUS, PROGRAM, DISPLAY METHOD, AND VIRTUAL IMAGE DISTRIBUTION SYSTEM

TECHNICAL FIELD

The present disclosure relates to a wearable terminal apparatus, a program, a display method, and a virtual image distribution system.

BACKGROUND OF INVENTION

In the related art, virtual reality (VR), mixed reality (MR), and augmented reality (AR) are known technologies that allow a user to experience a virtual image and/or a virtual space using a wearable terminal apparatus worn by the user on the head. The wearable terminal apparatus includes a display unit that covers the field of vision of the user when worn by the user. A virtual image and/or a virtual space are/is displayed on this display unit in accordance with a position and an orientation of the user. In this manner, a visual effect as if the virtual image and/or the virtual space were present is implemented (for example, U.S. Patent Application Publication No. 2019/0087021 and U.S. Patent Application Publication No. 2019/0340822).

MR is a technology that displays a virtual image as if the virtual image were present at a predetermined position in a real space while allowing a user to visually recognize the real space, to allow the user to experience mixed reality in which the real space and the virtual image are merged. VR is a technology that allows a user to visually recognize a virtual space instead of the real space in MR, to allow the user to experience as if the user were in the virtual space.

A display position of the virtual image displayed in VR and MR is determined in a space in which the user is located. When the display position is inside the visible region of the user, the virtual image is displayed on the display unit and is visually recognized by the user.

SUMMARY

In the present disclosure, a wearable terminal apparatus to be worn by a user for use includes at least one processor. The at least one processor causes a display unit to display a virtual image of a polyhedron located in a space. The at least one processor causes a first image having first information to be displayed on a first surface of the polyhedron and causes a second image having second information to be displayed on a second surface of the polyhedron. The virtual image of the polyhedron includes a planar two-sided virtual image having a front side and a back side.

In the present disclosure, a program causes a computer provided in a wearable terminal apparatus to be worn by a user for use to perform a process. The process includes causing a display unit to display a virtual image of a polyhedron located in a space. The process also includes causing a first image having first information to be displayed on a first surface of the polyhedron and causing a second image having second information to be displayed on a second surface of the polyhedron.

In the present disclosure, a display method is for a wearable terminal apparatus to be worn by a user for use. The display method includes causing a display unit to display a virtual image of a polyhedron located in a space. The display method also includes causing a first image having first information to be displayed on a first surface of the polyhedron and causing a second image having second information to be displayed on a second surface of the polyhedron.

In the present disclosure, a virtual image distribution system includes one wearable terminal apparatus to be worn by one user for use, another wearable terminal apparatus to be worn by another user for use, a management apparatus that manages the one wearable terminal apparatus and the another wearable terminal apparatus. The management apparatus includes at least one processor. The at least one processor causes a display unit of the one wearable terminal apparatus and a display unit of the another wearable terminal apparatus to display a virtual image of a polyhedron located in a space shared by the one user and the another user. The at least one processor causes an image visually recognizable by the one user in the one wearable terminal apparatus to be displayed on a first surface of the polyhedron. The at least one processor causes an image visually recognizable by the another user in the another wearable terminal apparatus to be displayed on a second surface of the polyhedron.

DESCRIPTION OF EMBODIMENTS

Embodiments are described below with reference to the drawings. Note that each drawing to be referred to below illustrates in a simplified manner merely major members necessary for describing the embodiments for convenience of explanation. Therefore, a wearable terminal apparatus 10 and an information processing apparatus 20 according to the present disclosure may include any constituent member that is not illustrated in drawings to be referred to.

First Embodiment

Figure 1:
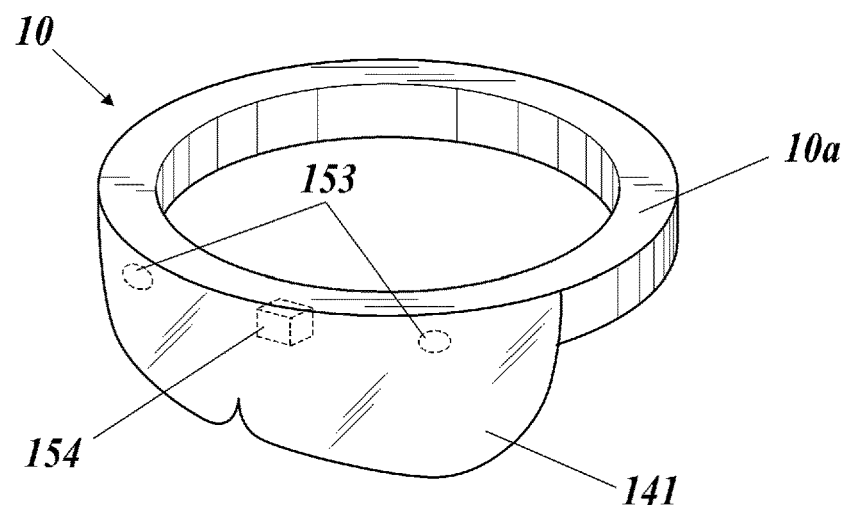
FIG. 1 is a schematic perspective view of a configuration of a wearable terminal apparatus according to a first embodiment.

As illustrated in FIG. 1, the wearable terminal apparatus 10 includes a body 10a and a visor 141 (display member) attached to the body 10a.

The body 10a is an annular member having an adjustable circumferential length. The body 10a includes various devices such as a depth sensor 153 and a camera 154 built therein. When a user wears the body 10a on the head, the visor 141 covers the field of vision of the user.

The visor 141 has a light-transmitting property. The user can visually recognize a real space through the visor 141. The body 10a includes a laser scanner 142 (see FIG. 4) therein. The laser scanner 142 projects and displays an image such as a virtual image onto a display surface of the visor 141 facing the eyes of the user. The user visually recognizes the virtual image by reflected light from the display surface. At this time, the user also visually recognizes the real space through the visor 141. Thus, a visual effect as if the virtual image were present in the real space is obtained.

Figure 2:
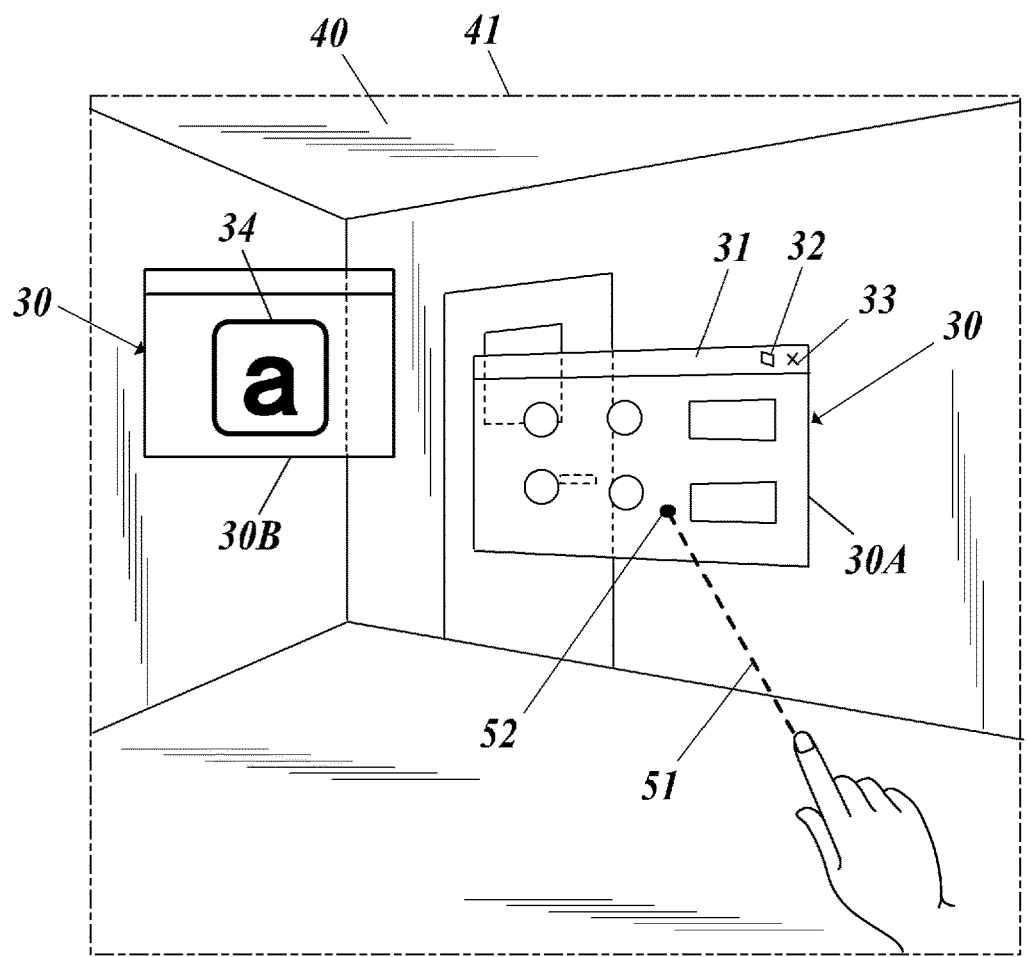
FIG. 2 is a diagram illustrating an example of a visible region and a virtual image visually recognized by a user wearing the wearable terminal apparatus.

As illustrated in FIG. 2, when a virtual image 30 is displayed, the user visually recognizes the virtual image 30 disposed toward a predetermined direction at a predetermined position in a space 40. In the present embodiment, the space 40 is the real space visually recognized by the user through the visor 141. Since the virtual image 30 is projected onto the visor 141 having a light-transmitting property, the virtual image 30 is visually recognized as a translucent image superimposed on the real space. In FIG. 2, the virtual image 30 is illustrated as a planar window screen. However, the virtual image 30 is not limited to this, and may be various stereoscopic images, for example. When the virtual image 30 is a window screen, the virtual image 30 has a front side (first surface) 30A and a back side (second surface) 30B. Necessary information is displayed either on the front side 30A or on the back side 30B. Note that the virtual image 30 of the window screen has a thickness within a range up to a predetermined thickness.

Figure 3:
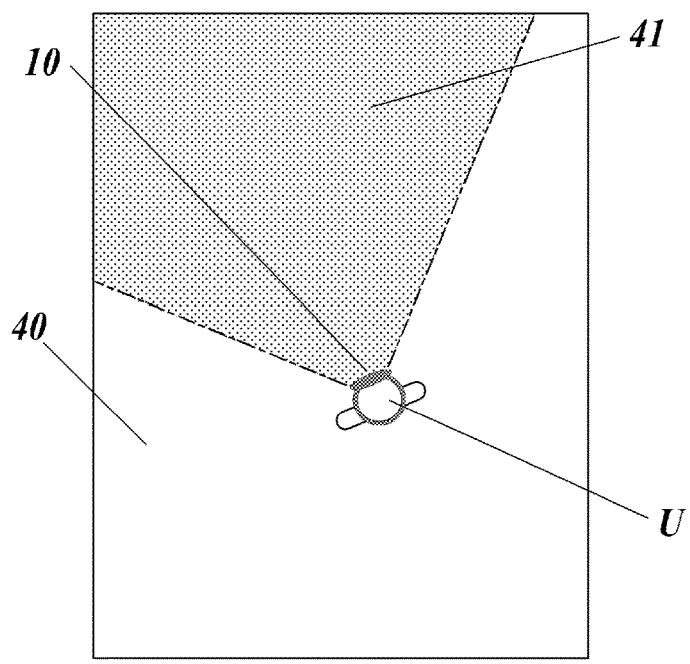
FIG. 3 is a diagram for describing the visible region in a space.

The wearable terminal apparatus 10 detects a visible region 41 of the user, based on a position and an orientation of the user in the space 40 (in other words, a position and an orientation of the wearable terminal apparatus 10). As illustrated in FIG. 3, the visible region 41 is a region located in front of a user U wearing the wearable terminal apparatus 10 in the space 40. For example, the visible region 41 is a region within a predetermined angle range in each of a left-right direction and an up-down direction with respect to the front of the user U. In this case, when a solid corresponding to the shape of the visible region 41 is cut along a plane perpendicular to the front direction of the user U, the cut surface has a quadrangular shape. Note that the shape of the visible region 41 may be determined such that the cut surface has a shape other than the quadrangular shape (such as a circular shape or elliptic shape, for example). The shape of the visible region 41 (for example, angle ranges in the left-right direction and the up-down direction with respect to the front) can be identified using a following method, for example.

The wearable terminal apparatus 10 performs field-of-view adjustment (hereinafter, referred to as calibration) in a predetermined procedure at a predetermined timing such as at the initial startup. By this calibration, a range visually recognizable by the user is identified. Thereafter, the virtual image 30 is displayed within this range. The shape of the visually recognizable range identified by this calibration can be set as the shape of the visible region 41.

The calibration is not limited to calibration performed in the predetermined procedure described above. The calibration may be automatically performed while the wearable terminal apparatus 10 performs a normal operation. For example, when there is no reaction on a display to which a reaction is to be made by the user, the wearable terminal apparatus 10 may regard the display range as being outside the range of the field of view of the user and adjust the field of view (and the shape of the visible region 41). When there is a reaction from the user on a display that is experimentally made at a position determined to be outside the range of the field of view, the wearable terminal apparatus 10 may regard the display range as being inside the range of the field of view of the user and adjust the field of view (and the shape of the visible region 41).

Note that the shape of the visible region 41 may be determined and fixed in advance at the time of shipment or the like irrespective of the adjustment result of the field of view. For example, the shape of the visible region 41 may be determined to be a maximum displayable range in terms of the optical design of a display unit 14.

In response to a predetermined user operation, the virtual image 30 is generated with a determined display position and a determined orientation in the space 40. The wearable terminal apparatus 10 projects and displays, onto the visor 141, the virtual image 30 whose display position is determined to be inside the visible region 41 among the generated virtual images 30. FIG. 2 illustrates the visible region 41 using a chain line.

The display position and the orientation of the virtual image 30 on the visor 141 are updated in real time in accordance with a change of the visible region 41 of the user. That is, the display position and the orientation of the virtual image 30 change in accordance with the change of the visible region 41 so that the user recognizes that "the virtual image 30 is located at the set position and in the set orientation in the space 40". For example, when the user moves from the front side to the back side of the virtual image 30, the shape (angle) of the displayed virtual image 30 gradually changes in accordance with this movement. When the user moves to the back side of the virtual image 30 and then faces toward the virtual image 30, the back side 30B is displayed so that the back side 30B of the virtual image 30 is visually recognized. In response to the change of the visible region 41, the virtual image 30 whose display position becomes out of the visible region 41 is no longer displayed, and if there is the virtual image 30 whose display position enters the visible region 41, the virtual image 30 is newly displayed.

As illustrated in FIG. 2, when the user stretches their hand (or finger) forward, the wearable terminal apparatus 10 detects the stretching direction of the hand, and displays a virtual line 51 extending in the direction and a pointer 52 on the display surface of the visor 141, which are visually recognized by the user. The pointer 52 is displayed at an intersection of the virtual line 51 and the virtual image 30. When the virtual line 51 does not intersect with the virtual image 30, the pointer 52 may be displayed at an intersection of the virtual line 51 with a wall surface or the like in the space 40. When a distance between the user's hand and the virtual image 30 is within a predetermined reference distance, display of the virtual line 51 may be omitted and the pointer 52 may be directly displayed at a position corresponding to the position of the fingertip of the user.

The user can adjust the direction of the virtual line 51 and the position of the pointer 52 by changing the stretching direction of the hand. The user performs a predetermined gesture after adjusting the pointer 52 to be located at a predetermined operation target (such as a function bar 31, a window shape change button 32, or a close button 33, for example) included in the virtual image 30. The wearable terminal apparatus 10 detects this gesture. Thus, the user can perform a predetermined operation on the operation target. For example, by performing a gesture (for example, a pinch gesture with fingers) of selecting an operation target with the pointer 52 placed at the close button 33, the user can close (delete) the virtual image 30. By performing the selecting gesture with the pointer 52 placed at the function bar 31 and performing a gesture of moving the hand forward, backward, leftward, and rightward in the selected state, the user can move the virtual image 30 in a depth direction and a left-right direction. The operations performed on the virtual image 30 are not limited these operations.

As described above, the wearable terminal apparatus 10 according to the present embodiment can implement a visual effect as if the virtual image 30 were present in the real space and can accept a user operation on the virtual image 30 and reflect the user operation on the display of the virtual image 30. That is, the wearable terminal apparatus 10 according to the present embodiment provides MR.

A functional configuration of the wearable terminal apparatus 10 is described with reference to FIG. 4.

The wearable terminal apparatus 10 includes a central processing unit (CPU) 11, a random access memory (RAM) 12, a storage unit 13, the display unit 14, a sensor unit 15, and a communication unit 16. These components are connected to one another by a bus 17. The components except for the visor 141 of the display unit 14 among the components illustrated in FIG. 4 are built in the body 10a and operate by electric power supplied from a battery also built in the body 10a.

The CPU 11 is a processor that performs various kinds of arithmetic processing and integrally controls operations of the components of the wearable terminal apparatus 10. The CPU 11 reads and executes a program 131 stored in the storage unit 13 to perform various control operations. The CPU 11 executes the program 131 to perform a visible region detection process and a display control process, for example. Among these processes, the visible region detection process is a process of detecting the visible region 41 of the user in the space 40. The display control process is a process of causing the display unit 14 to display the virtual image 30 whose position is determined to be inside the visible region 41 among the virtual images 30 whose positions in the space 40 are determined.

Figure 4:
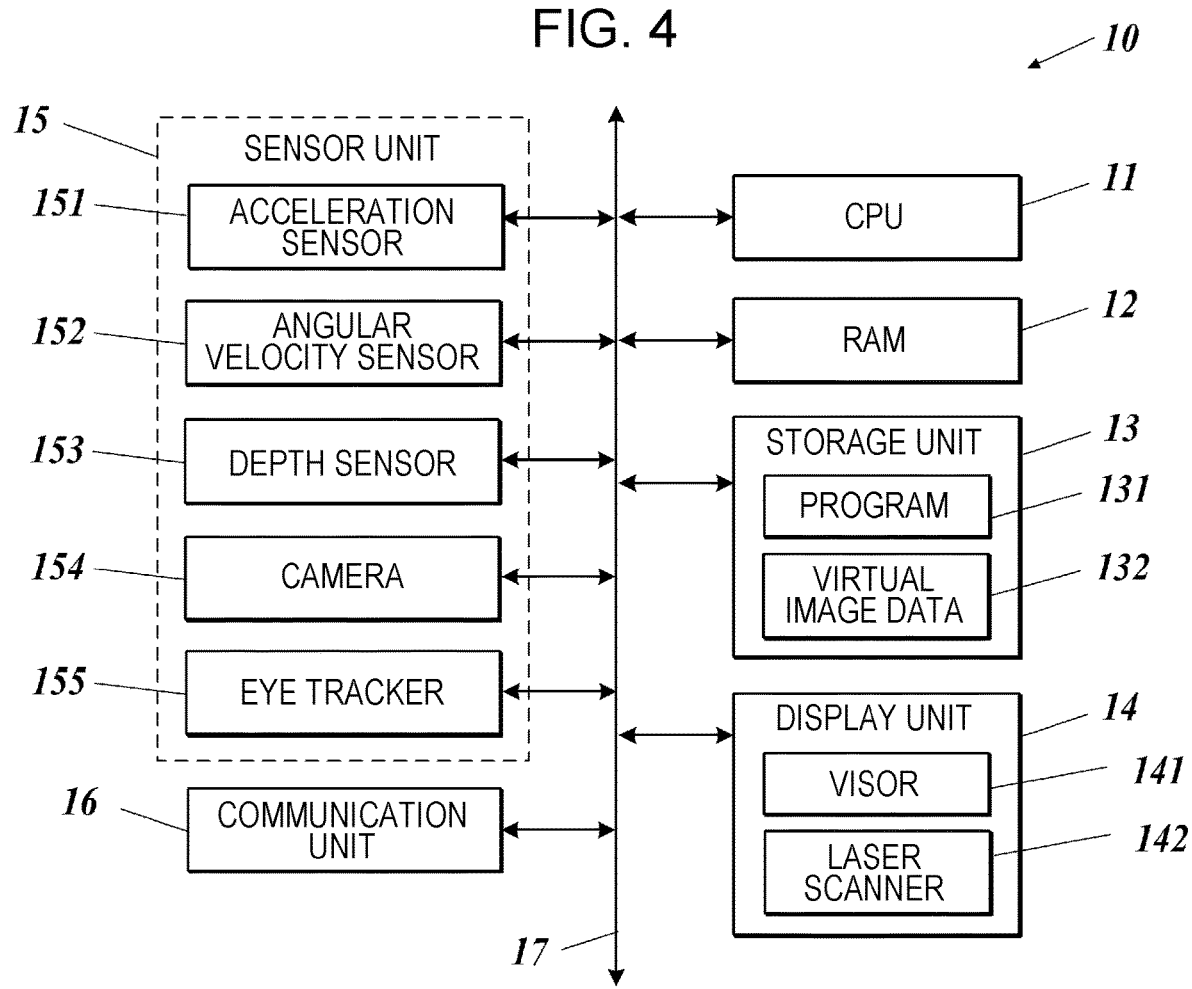
FIG. 4 is a block diagram illustrating a major functional configuration of the wearable terminal apparatus.

Although FIG. 4 illustrates a single CPU 11, the configuration is not limited to this configuration. Two or more processors such as CPUs may be provided. These two or more processors may perform in a distributed manner the processes performed by the CPU 11 in the present embodiment.

The RAM 12 provides a working memory space for the CPU 11 and stores temporary data.

The storage unit 13 is a non-transitory recording medium readable by the CPU 11 which is a computer. The storage unit 13 stores the program 131 to be executed by the CPU 11, various kinds of setting data, and so on. The program 131 is stored in the storage unit 13 in a form of a computer-readable program code. Examples of the storage unit 13 to be used include a nonvolatile storage device such as a solid state drive (SSD) including a flash memory.

Data stored in the storage unit 13 includes virtual image data 132 related to the virtual image 30. The virtual image data 132 includes data (for example, image data) related to display content of the virtual image 30, data of a display position, and data of an orientation.

The display unit 14 includes the visor 141, the laser scanner 142, and an optical system that guides light output from the laser scanner 142 to the display surface of the visor 141. The laser scanner 142 irradiates the optical system with pulsed laser light, of which ON and OFF are controlled for each pixel in accordance with a control signal from the CPU 11, while performing a scan in a predetermined direction. The laser light incident to the optical system forms a display screen that is a two-dimensional pixel matrix on the display surface of the visor 141. A to-be-used system of the laser scanner 142 may be, but not limited to, a system of performing a scan with laser light by operating a mirror by micro electro mechanical systems (MEMS), for example. The laser scanner 142 includes three light-emitting units that emit laser light of red (R), green (G), and blue (B), for example. The display unit 14 projects light from these light-emitting units onto the visor 141, and thus can implement color display.

The sensor unit 15 includes an acceleration sensor 151, an angular velocity sensor 152, the depth sensor 153, the camera 154, and an eye tracker 155. Note that the sensor unit 15 may further include a sensor not illustrated in FIG. 4.

The acceleration sensor 151 detects an acceleration and outputs a detection result to the CPU 11. A translational motion of the wearable terminal apparatus 10 in three orthogonal axial directions can be detected from the detection result obtained by the acceleration sensor 151.

The angular velocity sensor 152 (gyro sensor) detects an angular velocity and outputs a detection result to the CPU 11. A rotational motion of the wearable terminal apparatus 10 can be detected from the detection result obtained by the angular velocity sensor 152.

The depth sensor 153 is an infrared camera that detects a distance to a subject by a time of flight (ToF) method, and outputs a detection result of the distance to the CPU 11. The depth sensor 153 is provided on the front surface of the body 10a to be able to image the visible region 41. Each time the position and the orientation of the user change in the space 40, the depth sensor 153 repeatedly performs measurement. By combining the results, three-dimensional mapping of the entire space 40 can be performed (that is, a three-dimensional structure can be acquired).

The camera 154 images the space 40 with a group of RGB imaging elements, acquires color image data as an imaging result, and outputs the color image data to the CPU 11. The camera 154 is provided on the front surface of the body 10a to be able to image the visible region 41. The output image from the camera 154 is used to detect the position, the orientation, and the like of the wearable terminal apparatus 10. The output image is also transmitted from the communication unit 16 to an external device and is used to display the visible region 41 of the user of the wearable terminal apparatus 10 on the external device.

The eye tracker 155 detects the line of sight of the user and outputs a detection result to the CPU 11. The method of detecting the line of sight to be used may be, but not limited to, a method in which reflection points of near-infrared light in the eyes of the user are imaged by an eye tracking camera and the imaging result and an image obtained by the camera 154 are analyzed to identify the target visually recognized by the user, for example. A part of the configuration of the eye tracker 155 may be provided in a peripheral portion or the like of the visor 141.

The communication unit 16 is a communication module including an antenna, a modulation/demodulation circuit, and a signal processing circuit. The communication unit 16 transmits and receives data to and from an external device by wireless communication in accordance with a predetermined communication protocol.

In the wearable terminal apparatus 10 thus configured, the CPU 11 performs control operations below.

The CPU 11 performs three-dimensional mapping of the space 40, based on the distance data to the subject input from the depth sensor 153. The CPU 11 repeatedly perform this three-dimensional mapping each time the position and orientation of the user change, and updates the result each time. The CPU 11 performs three-dimensional mapping in units of the continuous space 40. Thus, when the user moves between multiple rooms partitioned by a wall or the like, the CPU 11 recognizes each room as one space 40 and performs three-dimensional mapping separately for each room.

The CPU 11 detects the visible region 41 of the user in the space 40. Specifically, the CPU 11 identifies the position and the orientation of the user (the wearable terminal apparatus 10) in the space 40, based on the detection results obtained by the acceleration sensor 151, the angular velocity sensor 152, the depth sensor 153, the camera 154, and the eye tracker 155 and the accumulated three-dimensional mapping results. The CPU 11 then detects (identifies) the visible region 41, based on the identified position and the orientation and the predetermined shape of the visible region 41. The CPU 11 continuously detects the position and the orientation of the user in real time, and updates the visible region 41 in conjunction with the change in the position and the orientation of the user. Note that the visible region 41 may be detected using the detection results of some of the acceleration sensor 151, the angular velocity sensor 152, the depth sensor 153, the camera 154, and the eye tracker 155.

The CPU 11 generates the virtual image data 132 related to the virtual image 30 in response to a user operation. That is, in response to detecting a predetermined operation (gesture) for instructing generation of the virtual image 30, the CPU 11 identifies the display content (for example, image data), the display position, and the orientation of the virtual image, and generates the virtual image data 132 including date representing these identified results.

The CPU 11 causes the display unit 14 to display the virtual image 30 whose display position is determined to be inside the visible region 41. The CPU 11 identifies the virtual image 30 whose display position is determined to be inside the visible region 41, based on the information of the display position included in the virtual image data 132, and generates image data of a display screen to be displayed on the display unit 14, based on a positional relationship between the visible region 41 at that time point and the display position of the identified virtual image 30. Based on this image data, the CPU 11 causes the laser scanner 142 to perform a scan operation to form the display screen including the identified virtual image 30 on the display surface of the visor 141. That is, the CPU 11 causes the virtual image 30 to be displayed on the display surface of the visor 141, the virtual image 30 being visually recognized in the space 40 that is visually recognized through the visor 141. By continuously performing this display control process, the CPU 11 updates the display content on the display unit 14 in real time in accordance with the movement of the user (change in the visible region 41). When a setting is made to hold the virtual image data 132 even in a power-off state of the wearable terminal apparatus 10, the existing virtual image data 132 is read in response to the next startup of the wearable terminal apparatus 10. If the virtual image 30 located inside the visible region 41 is present, the virtual image 30 is displayed on the display unit 14.

Note that the CPU 11 may generate the virtual image data 132 based on instruction data acquired from an external device via the communication unit 16, and may cause the virtual image 30 to be displayed based on the virtual image data 132. Alternatively, the CPU 11 may acquire the virtual image data 132 from an external device via the communication unit 16, and may cause the virtual image 30 to be displayed based on the virtual image data 132. For example, the CPU 11 may display a video from the camera 154 of the wearable terminal apparatus 10 on an external device operated by a remote instructor, may accept an instruction to display the virtual image 30 from the external device, and may cause the instructed virtual image 30 to be displayed on the display unit 14 of the wearable terminal apparatus 10. This enables an operation in which the virtual image 30 indicating work content is displayed near a work target object and the remote instructor instructs the user of the wearable terminal apparatus 10 to perform work, for example.

The CPU 11 detects the position and the orientation of the user's hand (and/or finger) based on the images obtained by the depth sensor 153 and the camera 154, and causes the display unit 14 to display the virtual line 51 extending in the detected direction and the pointer 52. The CPU 11 detects a gesture of the user's hand (and/or finger) based on the images obtained by the depth sensor 153 and the camera 154, and performs a process in accordance with the content of the detected gesture and the position of the pointer 52 at that time point.

An operation of the wearable terminal apparatus 10 when the virtual image 30 is located inside the visible region 41 is described.

As described above, in the wearable terminal apparatus 10, the virtual image 30 whose display position is determined to be inside the visible region 41 is displayed on the display unit 14 to be visually recognized by the user. However, when the virtual image 30 of the window screen is displayed on the display unit 14, no information is displayed on the back side of the virtual image 30 in the related art.

Accordingly, when the virtual image 30 of the window screen is displayed on the display unit 14, the CPU 11 of the wearable terminal apparatus 10 according to the present embodiment causes a first image having first information to be displayed on the front side 30A of the virtual image 30 and causes a second image having second information to be displayed on the back side. This enables the effective use of the back side of the virtual image 30 of the window screen. Display examples of the virtual image 30 of the window screen are described below with reference to FIGS. 5 to 21.

A control procedure of a virtual image display process according to an aspect of the present disclosure performed by the CPU 11 is described with reference to a flowchart of FIG. 5. The virtual image display process of FIG. 5 includes at least causing a first image having first information to be displayed on the front side 30A of the virtual image 30 and causing a second image having second information to be displayed on the back side of the virtual image 30 when the virtual image 30 of the window screen is displayed on the display unit 14.

Figure 5:
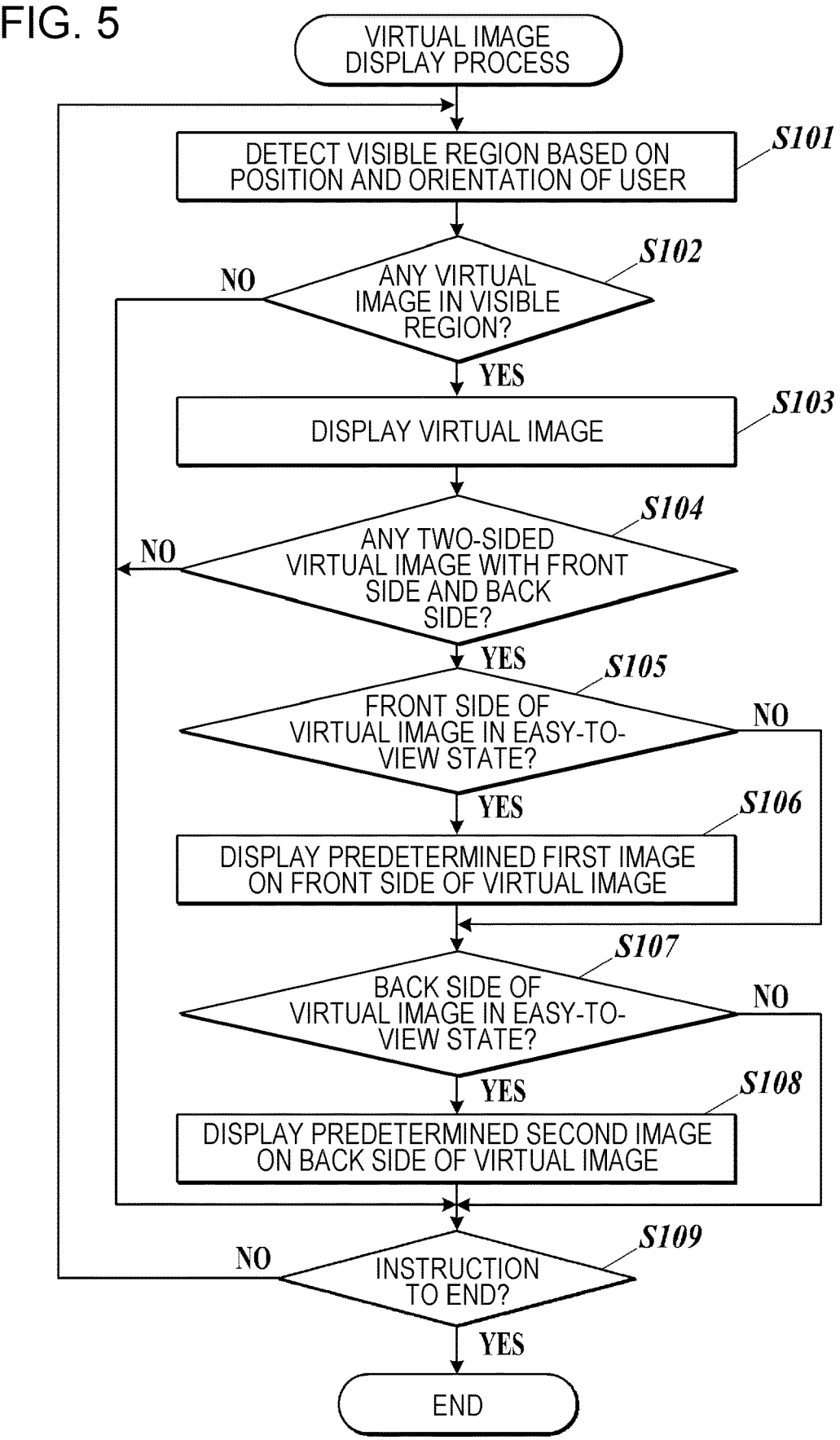
FIG. 5 is a flowchart illustrating a control procedure of a virtual image display process.

In response to the start of the virtual image display process illustrated in FIG. 5, the CPU 11 detects the visible region 41, based on a position and an orientation of the user (step S101).

The CPU 11 then determines whether the virtual image 30 whose display position is determined to be inside the detected visible region 41 is present (step S102).

If the CPU 11 determines in step S102 that the virtual image 30 whose display position is determined to be inside the detected visible region 41 is not present (NO in step S102), the process proceeds to step S109.

If the CPU 11 determines in step S102 that the virtual image 30 whose display position is determined to be inside the detected visible region 41 (YES in step S102), the CPU 11 causes the display unit 14 to display the virtual image 30 (step S103).

The CPU 11 then determines whether a two-sided virtual image 30 having the front side and the back side, that is, a virtual image 30 of a window screen is present among the virtual images 30 displayed on the display unit 14 (step S104).

If the CPU 11 determines in step S104 that a two-sided virtual image 30 having the front side and the back side is not present among the virtual images 30 displayed on the display unit 14 (NO in step S104), the process proceeds to step S109.

If the CPU 11 determines in step S104 that a two-sided virtual image 30 having the front side and the back side, that is, the virtual image 30 of the window screen is present among the virtual images 30 displayed on the display unit 14 (YES in step S104), the CPU 11 determines whether the front side 30A of the virtual image 30 is in an easy-to-view state for the user (step S105).

Description is given of a determination method of determining which of the front side 30A or the back side 30B of the virtual image 30 of the window screen is in the easy-to-view state for the user.

Figure 6:
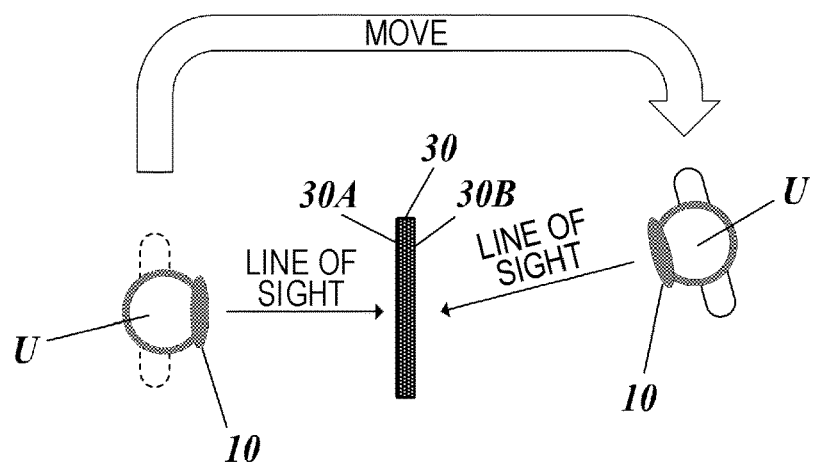
FIG. 6 is a diagram for describing a determination method of determining which of a front side or a back side of a virtual image of a window screen is in an easy-to-view state for the user.

In a first determination method, for example, when a user U is located at a position facing the front side 30A of the virtual image 30 of the window screen and an intersection of the virtual image 30 and a line of sight of the user U detected by the eye tracker 155 is on the front side 30A of the virtual image 30 as illustrated in FIG. 6, the CPU 11 determines that the front side 30A of the virtual image 30 is in the easy-to-view state for the user U. On the other hand, for example, when the user U moves from an area on the front side 30A of the virtual image 30 to an area on the back side 30B of the virtual image 30 and the intersection of the virtual image 30 and the line of sight of the user U detected by the eye tracker 155 is on the back side 30B of the virtual image 30, the CPU 11 determines that the back side 30B of the virtual image 30 is in the easy-to-view state for the user U. This allows the determination to be made accurately.

Note that the determination method is not limited to the method described above, and a second determination method or a third determination method described below may be used.

Figure 7:
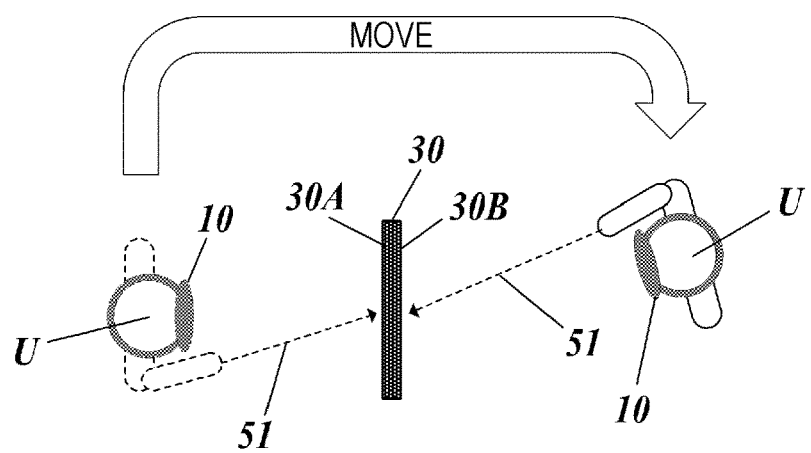
FIG. 7 is a diagram for describing the determination method of determining which of the front side or the back side of the virtual image of the window screen is in the easy-to-view state for the user.

In the second determination method, for example, when the user U is located at a position facing the front side 30A of the virtual image 30 of the window screen and an intersection of the virtual image 30 and the virtual line 51 extending in a direction in which the user stretches their hand is on the front side 30A of the virtual image 30 as illustrated in FIG. 7, the CPU 11 determines that the front side 30A of the virtual image 30 is in the easy-to-view state for the user U. On the other hand, for example, when the user U moves from an area on the front side 30A of the virtual image 30 to an area on the back side 30B of the virtual image 30 and the intersection of the virtual image 30 and the virtual line 51 extending in the direction in which the user U stretches their hand is on the back side 30B of the virtual image 30, the CPU 11 determines that the back side 30B of the virtual image 30 is in the easy-to-view state for the user U. This allows the determination to be made accurately.

Figure 8:
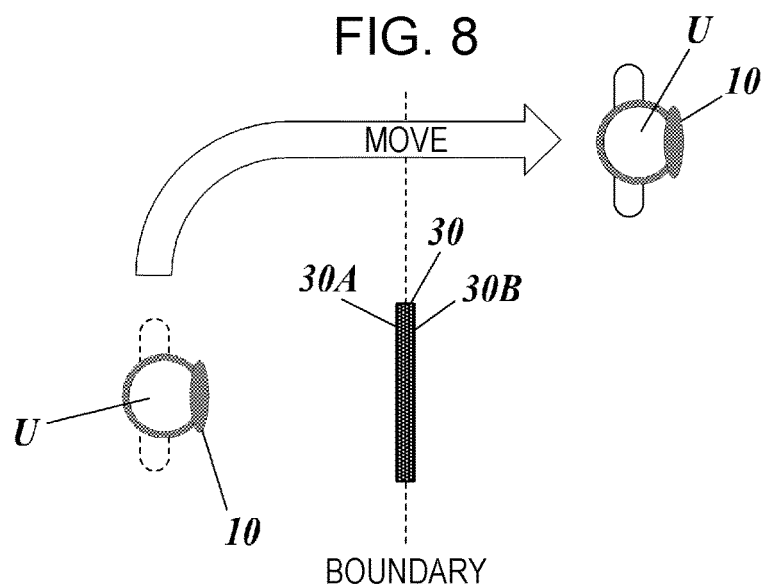
FIG. 8 is a diagram for describing the determination method of determining which of the front side or the back side of the virtual image of the window screen is in the easy-to-view state for the user.

In the third determination method, for example, when the user U is located at a position facing the front side 30A of the virtual image 30 of the window screen, that is, when the user U is located on the front side 30A with respect to a boundary between the front side 30A and the back side 30B as illustrated in FIG. 8, the CPU 11 determines that the front side 30A of the virtual image 30 is in the easy-to-view state for the user U. On the other hand, for example, when the user U is located on the back side 30B with respect to the boundary as a result of crossing the boundary of the virtual image 30 and moving from the front side 30A to the back side 30B, the CPU 11 determines that the back side 30B of the virtual image 30 is in the easy-to-view state for the user U irrespective of whether the user U visually recognizes the back side 30B of the virtual image 30. This allows the determination to be made accurately.

The description returns to the control procedure of the virtual image display process. If the CPU 11 determines in step S105 that the front side 30A of the virtual image 30 is in the easy-to-view state for the user (YES in step S105), the CPU 11 causes a predetermined first image (first image having first information) to be displayed on the front side 30A of the virtual image 30 (step S106). In such a case, the CPU 11 disables a user operation on the back side 30B of the virtual image 30 and disables a user operation for inverting the front side 30A and the back side 30B of the virtual image 30. The CPU 11 then causes the process to proceed to step S107.

If the CPU 11 determines in step S105 that the front side 30A of the virtual image 30 is not in the easy-to-view state for the user (NO in step S105), the CPU 11 skips step S106 and causes the process to proceed to step S107.

The CPU 11 then determines whether the back side 30B of the virtual image 30 is in the easy-to-view state for the user (step S107).

If the CPU 11 determines in step S107 that the back side 30B of the virtual image 30 is in the easy-to-view state for the user (YES in step S107), the CPU 11 causes a predetermined second image (second image having second information) to be displayed on the back side 30B of the virtual image 30 (step S108). In such a case, the CPU 11 disables a user operation on the front side 30A of the virtual image 30 and disables a user operation for inverting the front side 30A and the back side 30B of the virtual image 30. The CPU 11 then causes the process to proceed to step S109.

If the CPU 11 determines in step S107 that the back side 30B of the virtual image 30 is not in the easy-to-view state for the user (NO in step S107), the CPU 11 skips step S108 and causes the process to proceed to step S109.

The CPU 11 then determines whether an instruction to end the display operation of the wearable terminal apparatus 10 is given (step S109).

If the CPU 11 determines in step S109 that an instruction to end the display operation of the wearable terminal apparatus 10 is not given (NO in step S109), the CPU 11 returns the process to step S101, and performs the subsequent processing.

If the CPU 11 determines in step S109 that an instruction to end the display operation of the wearable terminal apparatus 10 is given (YES in step S109), the CPU 11 ends the virtual image display process.

Description is given below of a specific display style when an operation of displaying the virtual image 30 on the front side 30A is performed in step S106 and a specific display style when an operation of displaying the virtual image 30 on the back side 30B of the virtual image 30 is performed in step S108.

Figure 9:
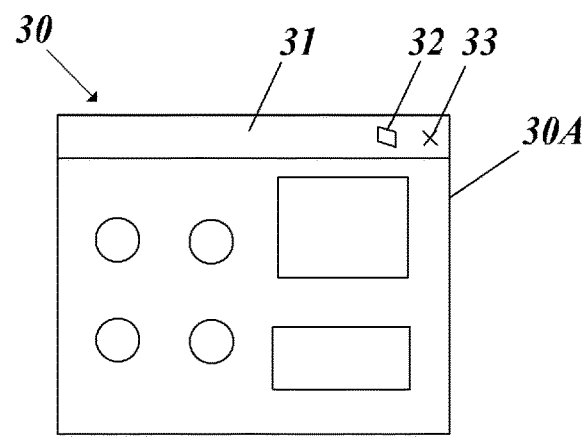
FIG. 9 is a diagram illustrating a display style of the front side of the virtual image of the window screen.
Figure 10:
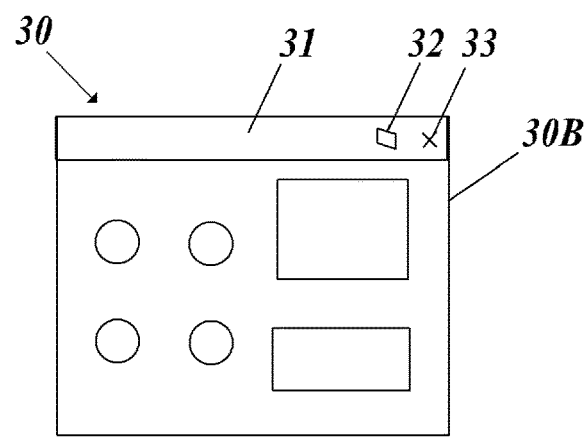
FIG. 10 is a diagram illustrating a display style of the back side of the virtual image illustrated in FIG. 9.

If the CPU 11 determines that the front side 30A of the virtual image 30 is in the easy-to-view state for the user, the CPU 11 causes a certain web page to be displayed as the predetermined first image (first image having the first information) on the front side 30A of the virtual image 30 as illustrated in FIG. 9. On the other hand, if the CPU 11 determines that the back side 30B of the virtual image 30 is in the easy-to-view state for the user, the CPU 11 causes the web page (an image having the same content as the first image) to be displayed also on the back side 30B of the virtual image 30 as illustrated in FIG. 10. This allows the web page to be viewed from both the front side 30A and the back side 30B of the virtual image 30, and thus can save the user from moving around the virtual image 30 in order to view the web site.

Figure 11:
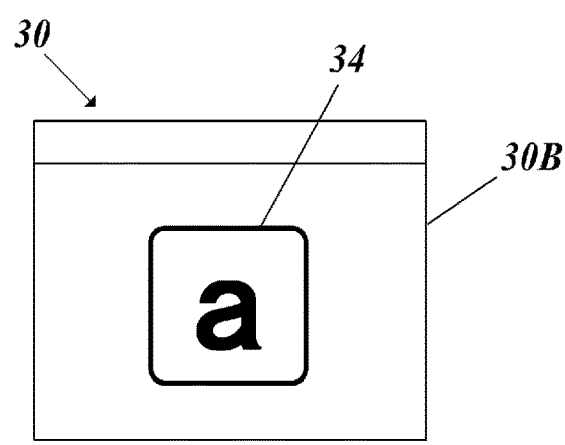
FIG. 11 is a diagram illustrating another example of the display style of the back side of the virtual image illustrated in FIG. 9.

In another display style, when the CPU 11 determines that the front side 30A of the virtual image 30 is in the easy-to-view state for the user, the CPU 11 causes the certain web page to be displayed as the predetermined first image (first image having the first information) on the front side 30A of the virtual image 30 as illustrated in FIG. 9. On the other hand, when the CPU 11 determines that the back side 30B of the virtual image 30 is in the easy-to-view state for the user, the CPU 11 causes a browser icon (icon related to the web page) 34 to be displayed on the back side 30B of the virtual image 30 as illustrated in FIG. 11. In response to a user operation for placing the pointer 52 over this browser icon 34, the CPU 11 causes the web page displayed on the front side 30A of the virtual image 30 to be displayed also on the back side 30B. This allows the user to guess what is displayed on the front side 30A of the virtual image 30 when the user is located on the back side 30B of the virtual image 30. The web page displayed on the front side 30A of the virtual image 30 can be displayed also on the back side 30B in response to the user operation described above. This thus can save the user from moving to the front side 30A from the back side 30B of the virtual image 30 in order to view the web page.

Figure 12:
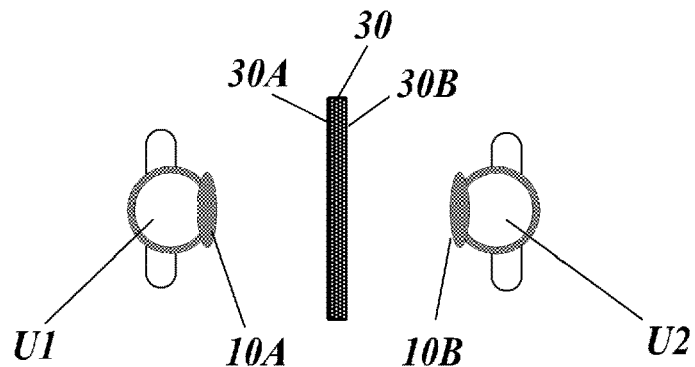
FIG. 12 is a diagram illustrating a state in which a virtual image of a window screen located in a space shared by one user and another user is visually recognized by the one user from the front side and by the another user from the back side.

In another display style, when the CPU 11 determines that the front side 30A of the virtual image 30 is in the easy-to-view state for a user U1 as illustrated in FIG. 12, the CPU 11 causes an image visually recognizable in a wearable terminal apparatus 10A worn by the user U1 for use, to be displayed as the predetermined first image (first image having the first information) on the front side 30A of the virtual image 30. On the other hand, when the CPU 11 determines that the back side 30B of the virtual image 30 is in the easy-to-view state for the user U1, the CPU 11 causes an image visually recognizable in a wearable terminal apparatus 10B worn by a user U2 different from the user U1 for use, to be displayed on the back side 30B of the virtual image 30.

Note that the image visually recognizable in the wearable terminal apparatus 10A worn by the user U1 for use and displayed on the front side 30A of the virtual image 30 is not visually recognizable in the wearable terminal apparatus 10B worn by the user U2 for use. Thus, even though the user U2 wearing the wearable terminal apparatus 10B moves from the area on the back side 30B of the virtual image 30 to the area on the front side 30A and view the front side 30A, the user U2 is unable to visually recognize the image on the front side 30A. In this case, the users U1 and U2 may be respectively notified by the wearable terminal apparatuses 10A and 10B that the front side 30A of the virtual image 30 is visually recognizable in the wearable terminal apparatus 10A and is not visually recognizable in the wearable terminal apparatus 10B.

The wearable terminal apparatus 10A worn by the user U1 for use is connected by communication via the communication unit 16 to the wearable terminal apparatus 10B worn by the user U2 for use. The wearable terminal apparatus 10A transmits the virtual image data 132 related to the virtual image 30 above to the wearable terminal apparatus 10B via the communication unit 16. In this manner, the wearable terminal apparatuses 10A and 10B can share the virtual image 30. In the example of FIG. 12, a single wearable terminal apparatus 10B is depicted. However, there may be multiple wearable terminal apparatuses 10B. That is, multiple users U2 may wear the respective wearable terminal apparatuses 10B to visually recognize the image displayed on the back side 30B of the virtual image 30.

Note that the method of sharing the virtual image 30 is not limited to the method in which the wearable terminal apparatus 10A transmits the virtual image data 132 of the virtual image 30 to the wearable terminal apparatus 10B via the communication unit 16 as described above. For example, a management apparatus (not illustrated) that manages the wearable terminal apparatuses 10A and 10B may distribute the virtual image data related to the virtual image 30 to the wearable terminal apparatuses 10A and 10B to share the virtual image 30. In such a case, a CPU (not illustrated) of the management apparatus causes the display unit of the wearable terminal apparatus 10A and the display unit of the wearable terminal apparatus 10B to display the virtual image 30 of the window screen located in the space shared by the users U1 and U2, and causes an image visually recognizable by the user U1 in the wearable terminal apparatus 10A to be displayed on the front side 30A of the virtual image 30 and causes an image visually recognizable by the user U2 in the wearable terminal apparatus 10B to be displayed on the back side 30B of the virtual image 30.

Description is given below of specific display styles of the images displayed on the front side 30A and the back side 30B of the virtual image 30 shared by the wearable terminal apparatuses 10A and 10B.

Figure 13:
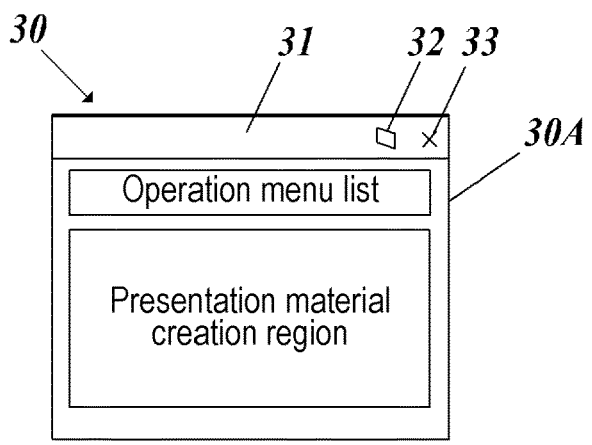
FIG. 13 is a diagram illustrating a display style of the virtual image of the window screen located in the space shared by the one user and the another user when the virtual image is visually recognized by the one user from the front side.
Figure 14:
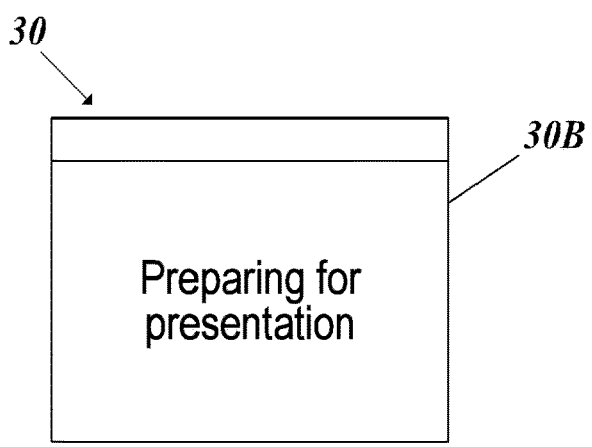
FIG. 14 is a diagram illustrating a display style when the virtual image illustrated in FIG. 13 is visually recognized by the another user from the back side.

As illustrated in FIG. 13, the CPU 11 causes an image related to a presentation application, for example, an image that allows selection of various functions of the application such as a work screen for creating a presentation material, to be displayed on the front side 30A of the virtual image 30 shared by the wearable terminal apparatuses 10A and 10B. On the other hand, as illustrated in FIG. 14, the CPU 11 causes, for example, an image representing text "Preparing for presentation" to be displayed on the back side 30B of the virtual image 30. Note that the image displayed on the front side 30A is not limited to the image related to the presentation application, and may be an image related to a document creation application or a table creation application, for example. The image displayed on the back side 30B may be an image not related to the presentation application or an image that does not allow selection of various function of the application, for example, a screen saver or moving image previously designated.

Figure 15:
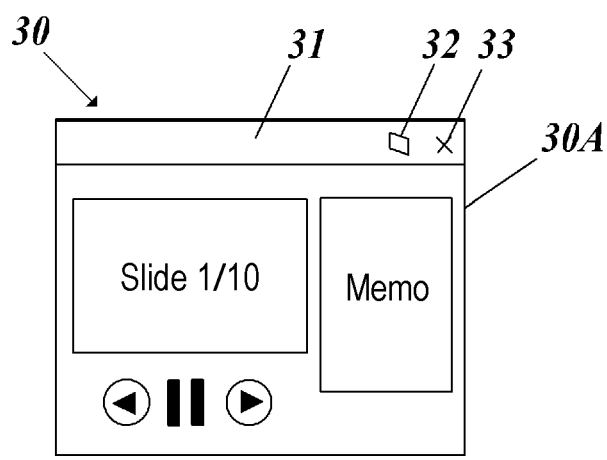
FIG. 15 is a diagram illustrating a display style of the virtual image of the window screen located in the space shared by the one user and the another user when the virtual image is visually recognized by the one user from the front side.
Figure 16:
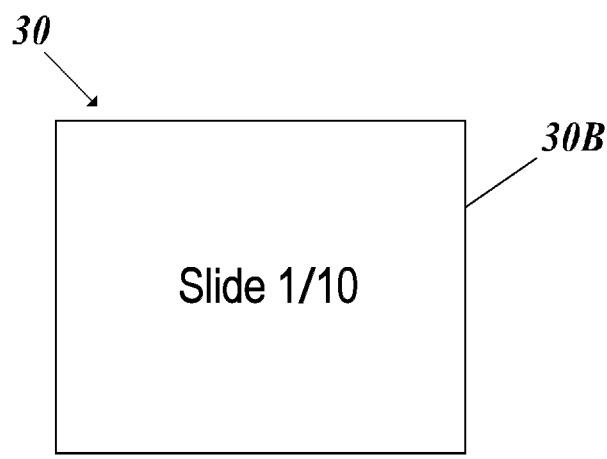
FIG. 16 is a diagram illustrating a display style when the virtual image illustrated in FIG. 15 is visually recognized by the another user from the back side.

In another display style, as illustrated in FIG. 15, the CPU 11 causes an image that is related to a presentation application and includes a memo region to be displayed on the front side 30A of the virtual image 30 shared by the wearable terminal apparatuses 10A and 10B. This image is an image used by a presenter (user U1) during presentation. On the other hand, as illustrated in FIG. 16, the CPU 11 causes an image that is related to the presentation application and does not include the memo region such as a slide shown to an audience (user U2) during presentation to be displayed on the back side 30B of the virtual image 30.

Figure 17:
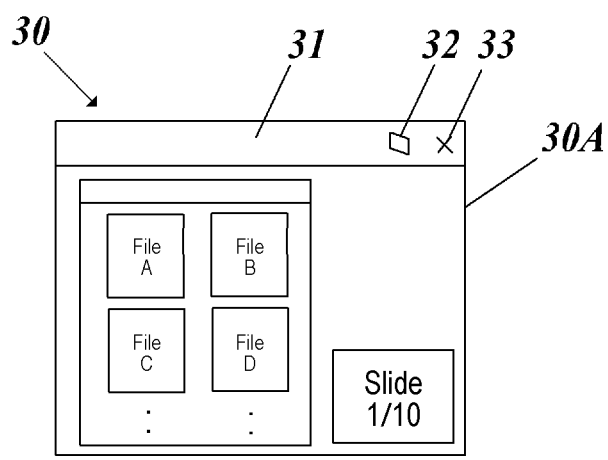
FIG. 17 is a diagram illustrating a display style of the virtual image of the window screen located in the space shared by the one user and the another user when the virtual image is visually recognized by the one user from the front side.
Figure 18:
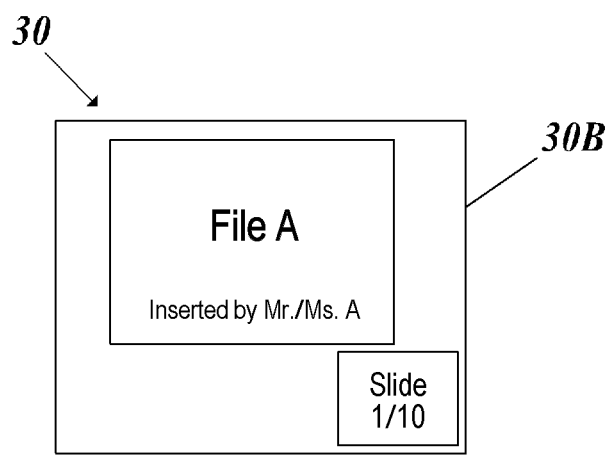
FIG. 18 is a diagram illustrating a display style when the virtual image illustrated in FIG. 17 is visually recognized by the another user from the back side.

In another display style, as illustrated in FIG. 17, the CPU 11 causes, for example, a series of designation operation screens for designating desired data to be displayed on the back side 30B in response to an operation of the user U1 while the image related to the presentation application is displayed on the front side 30A of the virtual image 30 shared by the wearable terminal apparatuses 10A and 10B. On the other hand, as illustrated in FIG. 18, in response to desired data (for example, a file A) being designated on the front side 30A, the CPU 11 causes an image related to the desired data to be displayed on the back side 30B of the virtual image 30.

Figure 19:
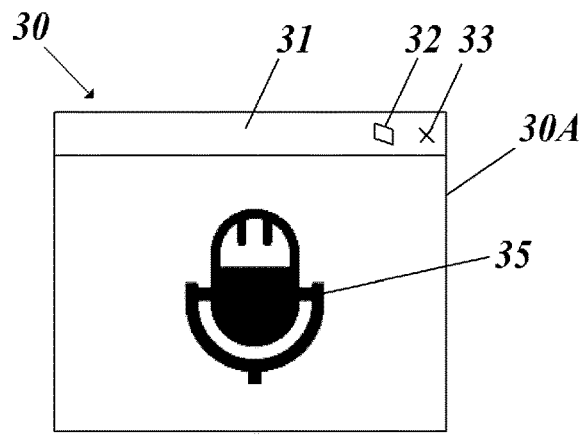
FIG. 19 is a diagram illustrating a display style of the virtual image of the window screen located in the space shared by the one user and the another user when the virtual image is visually recognized by the one user from the front side.
Figure 20:
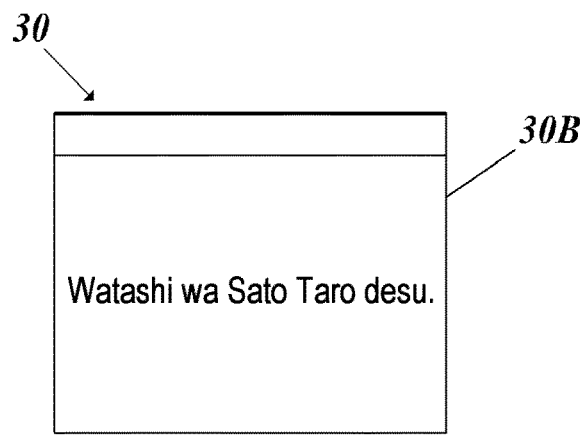
FIG. 20 is a diagram illustrating a display style when the virtual image illustrated in FIG. 19 is visually recognized by the another user from the back side.

In another display style, when a so-called text conversion application is started in response to an operation of the user U1, the CPU 11 causes a microphone icon 35 for prompting the user to speak to be displayed on the front side 30A of the virtual image 30 shared by the wearable terminal apparatuses 10A and 10B as illustrated in FIG. 19. As illustrated in FIG. 20, the CPU 11 converts audio data of the user U1 (for example, audio data "Watashi wa Sato Taro desu.") acquired by a microphone (not illustrated) which is audio data acquisition means included in the wearable terminal apparatus 10A into text data, and causes the text data (for example, text data "Watashi wa Sato Taro desu.") to be displayed on the back side 30B of the virtual image 30. Note that the text conversion application may be started in response to an operation of the user U2 instead of an operation of the user U1, and the CPU 11 may convert audio data of the user U1 into text data and cause the text data to be displayed on the back side 30B.

Figure 21:
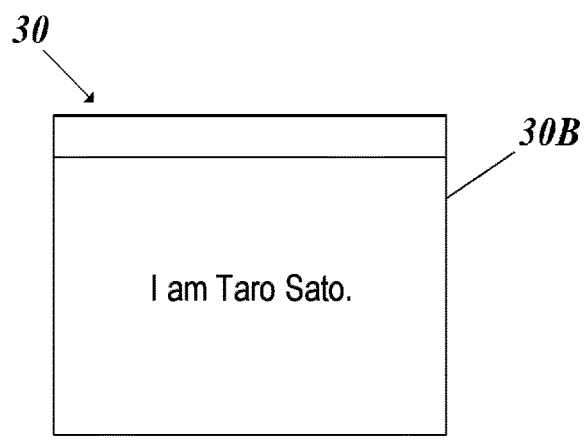
FIG. 21 is a diagram illustrating another example of the display style when the virtual image illustrated in FIG. 19 is visually recognized by the another user from the back side.

In another display style, when a so-called translation application is started in response to an operation of the user U1, the CPU 11 causes the microphone icon 35 prompting the user to speak to be displayed on the front side 30A of the virtual image 30 shared by the wearable terminal apparatuses 10A and 10B as illustrated in FIG. 19. As illustrated in FIG. 21, based on the audio data of the user U1 (for example, audio data "Watashi wa Sato Taro desu.") acquired by the microphone (not illustrated) which is the audio data acquisition means included in the wearable terminal apparatus 10A, the CPU 11 translates the audio data into text data in a predetermined language (for example, English) and causes the translated text data (for example, text data "I am Taro Sato.") to be displayed on the back side 30B of the virtual image 30. Note that the translation application may be started in response to an operation of the user U2 instead of an operation of the user U1, and the CPU 11 may translate audio data of the user U1 into text data and cause the translated text data to be displayed on the back side 30B.

Second Embodiment

A configuration of a display system 1 according to a second embodiment is described. The second embodiment is different from the first embodiment in that an external information processing apparatus 20 performs part of the process performed by the CPU 11 of the wearable terminal apparatus 10 in the first embodiment. Differences from the first embodiment are described below, and description of common points is omitted.

Figure 22:
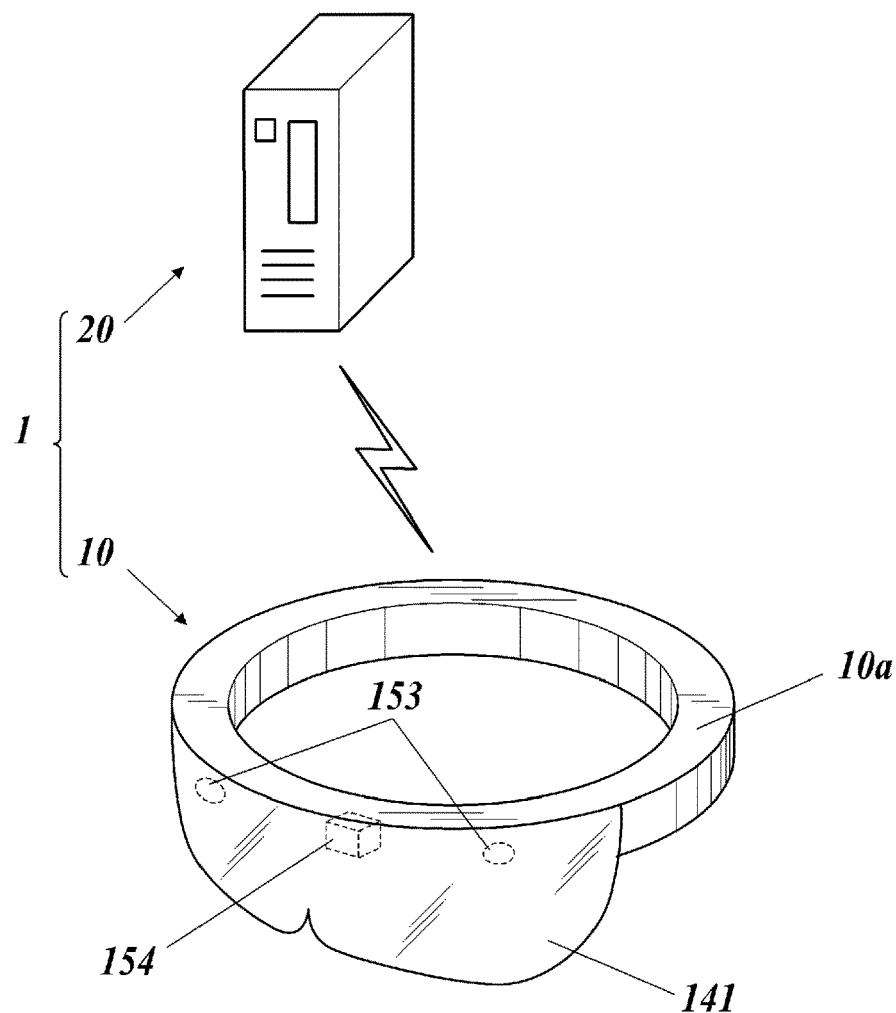
FIG. 22 is a schematic diagram illustrating a configuration of a display system according to a second embodiment.

As illustrated in FIG. 22, the display system 1 includes the wearable terminal apparatus 10 and the information processing apparatus 20 (server) connected to the wearable terminal apparatus 10 by communication. At least part of the communication path between the wearable terminal apparatus 10 and the information processing apparatus 20 may be based on wireless communication. The hardware configuration of the wearable terminal apparatus 10 may be the same as and/or similar to that of the first embodiment, but the processor for performing the same process as the process performed by the information processing apparatus 20 may be omitted.

Figure 23:
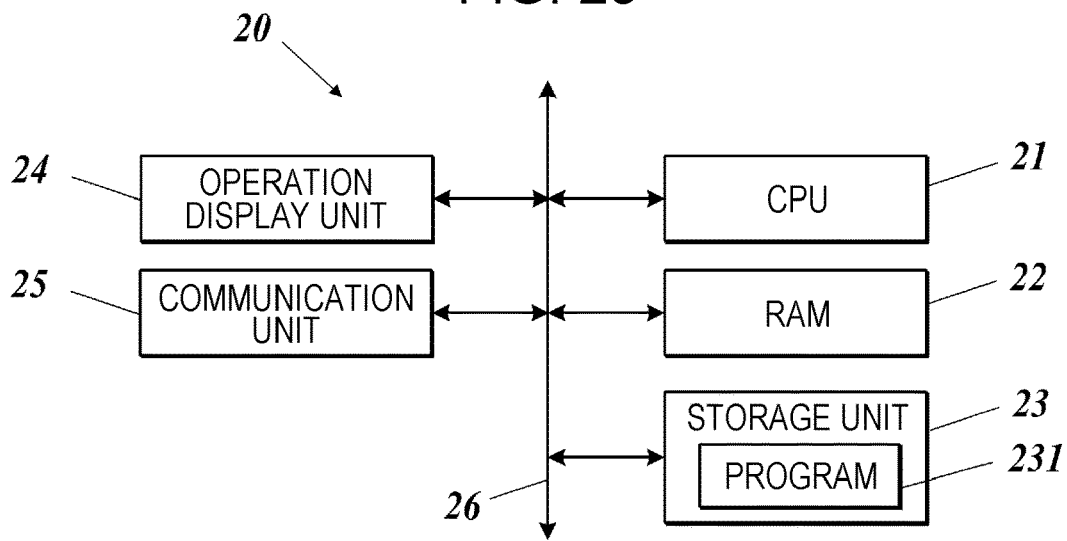
FIG. 23 is a block diagram illustrating a major functional configuration of an information processing apparatus.

As illustrated in FIG. 23, the information processing apparatus 20 includes a CPU 21, a RAM 22, a storage unit 23, an operation display unit 24, and a communication unit 25. These components are connected to one another by a bus 26.

The CPU 21 is a processor that performs various kinds of arithmetic processing and integrally controls operations of the components of the information processing apparatus 20. The CPU 21 reads and executes a program 231 stored in the storage unit 23 to perform various control operations.

The RAM 22 provides a working memory space for the CPU 21 and stores temporary data.

The storage unit 23 is a non-transitory recording medium readable by the CPU 21 which is a computer. The storage unit 23 stores the program 231 to be executed by the CPU 21, various kinds of setting data, and so on. The program 231 is stored in the storage unit 23 in a form of a computer-readable program code. Examples of the storage unit 23 to be used include a nonvolatile storage device such as a solid state drive (SSD) including a flash memory or a hard disk drive (HDD).

The operation display unit 24 includes a display device such as a liquid crystal display and an input device such as a mouse and keyboard. The operation display unit 24 performs various displays such as an operation status and a processing result of the display system 1 on the display device. The operation status of the display system 1 may include an image obtained in real time by the camera 154 of the wearable terminal apparatus 10. The operation display unit 24 converts a user's input operation on the input device into an operation signal and outputs the operation signal to the CPU 21.

The communication unit 25 communicates with the wearable terminal apparatus 10 to transmit and receive data. For example, the communication unit 25 receives data including some or all of the detection results obtained by the sensor unit 15 of the wearable terminal apparatus 10, information related to a user operation (gesture) detected by the wearable terminal apparatus 10, and so on. The communication unit 25 may be capable of communicating with an apparatus other than the wearable terminal apparatus 10.

In the display system 1 thus configured, the CPU 21 of the information processing apparatus 20 performs at least part of the process performed by the CPU 11 of the wearable terminal apparatus 10 in the first embodiment. For example, the CPU 21 may perform three-dimensional mapping of the space 40, based on the detection result obtained by the depth sensor 153. The CPU 21 may detect the visible region 41 of the user in the space 40, based on the detection result obtained by each component of the sensor unit 15. The CPU 21 may generate the virtual image data 132 related to the virtual image 30 in response to an operation of the user of the wearable terminal apparatus 10. The CPU 21 may detect the position and the orientation of the user's hand (and/or finger), based on images obtained by the depth sensor 153 and the camera 154.

The processing result obtained by the CPU 21 is transmitted to the wearable terminal apparatus 10 via the communication unit 25. The CPU 11 of the wearable terminal apparatus 10 operates each component (for example, the display unit 14) of the wearable terminal apparatus 10, based on the received processing result. The CPU 21 may transmit a control signal to the wearable terminal apparatus 10 to control the display on the display unit 14 of the wearable terminal apparatus 10.

In this way, the information processing apparatus 20 performs at least part of the process. This allows the apparatus configuration of the wearable terminal apparatus 10 to be simplified and can reduce the manufacturing cost. The use of the information processing apparatus 20 with higher performance can increase the speed and accuracy of various kinds of processing related to MR. Thus, the accuracy of the 3D mapping of the space 40, the display quality on the display unit 14, and the response speed of the display unit 14 relative to a user operation can be increased.

[Others]

The embodiments described above are merely an example and may be variously changed.

For example, in each of the embodiments described above, the visor 141 having a light-transmitting property is used to allow the user to visually recognize the real space. However, the configuration is not limited to this. For example, the visor 141 having a light-shielding property may be used to allow the user to visually recognize the image of the space 40 imaged by the camera 154. That is, the CPU 11 may cause the display unit 14 to display the image of the space 40 imaged by the camera 154 and the virtual image 30 superimposed on the image of the space 40. Such a configuration can also implement MR of merging the virtual image 30 with the real space.

The use of an image of the virtual space generated in advance instead of an image of the real space imaged by the camera 154 can implement VR that creates a sensation of being in the virtual space. In this VR, the visible region 41 of the user is identified, and the virtual image 30 whose display position is determined to be inside the visible region 41 in the virtual space are displayed.

The wearable terminal apparatus 10 is not limited to the apparatus having the annular body 10a illustrated in FIG. 1, and may have any structure that has a display unit visually recognizable by the user when the user wears the apparatus. For example, the wearable terminal apparatus 10 may be configured to cover the entire head such as a helmet. The wearable terminal apparatus 10 may have a frame placed on ears such as glasses, and the frame may include various devices built therein.

An example has been described in which a gesture of a user is detected and accepted as an input operation. However, the configuration is not limited to this. For example, the input operation may be accepted using a controller held by the user in hand or worn by the user on the body for use.

In the embodiments described above, the display styles of the images displayed on the front side 30A and the back side 30B of the virtual image 30 of the window screen shared by the wearable terminal apparatuses 10A and 10B are illustrated as an example. In another example, an image that is related to a document creation application and includes a comment region may be displayed on the front side 30A of the virtual image 30 and an image that is related to the document creation application and does not include the comment region may be displayed on the back side 30B of the virtual image 30. An image that is related to a table creation application and includes a specific sheet may be displayed on the front side 30A of the virtual image 30, and an image that is related to the table creation application and does not include the specific sheet may be displayed on the back side 30B of the virtual image 30. In the embodiment described above, for example, as illustrated in FIGS. 15 and 16, the image that is related to the presentation application and includes the memo region is displayed on the front side 30A of the virtual image 30 shared by the wearable terminal apparatuses 10A and 10B, and the image that is related to the presentation application and does not include the memo region is displayed on the back side 30B of the virtual image 30. In this case, in response to a predetermined operation of the user U1 on the front side 30A, the image that is related to the presentation application, does not include the memo region, and is displayed on the back side 30B at this time may be displayed on the front side 30A. In the cases of the display styles described in individual sets of FIGS. 13 and 14, FIGS. 17 and 18, FIGS. 19 and 20, and FIGS. 19 and 21, the image displayed on the back side 30B at this time may be displayed on the front side 30A in response to a predetermined operation of the user U1 on the front side 30A.

In the virtual image display process (see FIG. 5) according to the embodiment described above, the control procedure of causing the predetermined first image to be displayed on the front side 30A of the virtual image 30 and causing the predetermined second image to be displayed on the back side 30B is limited to the two-sided virtual image 30 (virtual image 30 of the window screen) having the front side 30A that is a first surface and the back side 30B that is a second surface. However, the target virtual image 30 having the first surface on which the predetermined first image is displayed and the second surface on which the predetermined second image is displayed is not limited to the two-sided virtual image 30 having the front side 30A and the back side 30B and may be a virtual image of a tetrahedron, hexahedron, or the like. For example, when the virtual image is a hexahedron, the second surface on which the predetermined second image is displayed may be a surface that shares a side with the first surface on which the predetermined first image is displayed or may be a surface not sharing a side with the first image surface.

In addition, specific details of the configuration and control described in the embodiments above can be appropriately changed within the scope not departing from the gist of the present disclosure. The configuration and control described in the embodiments above can be combined as appropriate within the scope not departing from the gist of the present disclosure.

INDUSTRIAL APPLICABILITY

The present disclosure can be used for a wearable terminal apparatus, a program, a display method, and a virtual image distribution system.

REFERENCE SIGNS 1 display system
10, 10A, 10B wearable terminal apparatus
10a body
11 CPU (processor)
12 RAM
13 storage unit
131 program
132 virtual image data
14 display unit
141 visor (display member)
142 laser scanner
15 sensor unit
151 acceleration sensor
152 angular velocity sensor
153 depth sensor
154 camera
155 eye tracker
16 communication unit
17 bus
20 information processing apparatus
21 CPU
22 RAM
23 storage unit
231 program
24 operation display unit
25 communication unit
26 bus
30 virtual image
30A front side (first surface)
30B back side (second surface)
31 function bar
32 window shape change button
33 close button
40 space
41 visible region
51 virtual line
52 pointer U user
U1 user (one user)
U2 user (another user)

The invention claimed is:

1. A wearable terminal apparatus to be worn by a user for use, comprising:
at least one circuitry, wherein
the at least one circuitry is configured to:
cause a display unit to display a virtual image of a polyhedron located in a space;
cause a first image having first information to be displayed on a first surface of the polyhedron and cause a second image having second information to be displayed on a second surface of the polyhedron; and
disable an operation of rotating the virtual image in response to a user operation when the first image is displayed on the first surface and the second image is displayed on the second surface.

2. The wearable terminal apparatus according to claim 1, wherein
the display unit includes a display member having a light-transmitting property, and
the at least one circuitry is configured to cause the virtual image to be displayed on a display surface of the display member, the virtual image being visually recognized in the space that is visually recognized through the display member.

3. The wearable terminal apparatus according to claim 1, further comprising:
a camera configured to image the space, and
the at least one circuitry is configured to cause the display unit to display an image of the space imaged by the camera and the virtual image superimposed on the image of the space.

4. The wearable terminal apparatus according to claim 1, wherein the at least one circuitry is configured to:
determine which of the first surface or the second surface is in an easy-to-view state for the user;
disable a user operation on the second surface if the first surface is determined to be in the easy-to-view state; and
disable a user operation on the first surface if the second surface is determined to be in the easy-to-view state.

5. The wearable terminal apparatus according to claim 1, wherein the second image is an image having same content as the first image.

6. The wearable terminal apparatus according to claim 1, wherein the second image is an icon related to display content of the first image.

7. The wearable terminal apparatus according to claim 6, wherein the at least one circuitry is configured to
cause the first image to be displayed on the second surface in response to a predetermined operation on the icon displayed on the second surface.

8. The wearable terminal apparatus according to claim 1, wherein
the first image is an image visually recognizable by the user in the wearable terminal apparatus, and
the second image is an image visually recognizable when another user visually recognizes the virtual image in another wearable terminal apparatus.

9. The wearable terminal apparatus according to claim 8, wherein
the second image is an image visually recognizable by the user in the wearable terminal apparatus.

10. The wearable terminal apparatus according to claim 8, wherein
the first image is an image not visually recognizable when the another user visually recognizes the virtual image in the another wearable terminal apparatus.

11. The wearable terminal apparatus according to claim 1, wherein
the first image is an image that is related to an application for at least one selected from the group consisting of document creation, table creation, and presentation and that allows selection of various functions of the application, and
the second image is an image that is not related to the application or an image that is related to the application and makes the various functions of the application unselectable.

12. The wearable terminal apparatus according to claim 1, wherein
the first image is an image that is related to a presentation application and includes a memo region, and
the second image is an image that is related to the presentation application and does not include the memo region.

13. The wearable terminal apparatus according to claim 1, wherein
the first image is an image that is related to a document creation application and includes a comment region, and
the second image is an image that is related to the document creation application and does not include the comment region.

14. The wearable terminal apparatus according to claim 1, wherein
the first image is an image that is related to a table creation application and includes a specific sheet, and
the second image is an image that is related to the table creation application and does not include the specific sheet.

15. The wearable terminal apparatus according to claim 11, wherein the at least one circuitry is configured to:
when the image that is related to the application for presentation is displayed as the first image on the first surface, allow a series of designation operation screens to be displayed on the first surface in response to a user operation, the series of designation operation screens being for designating desired data to be displayed on the second surface; and
in response to designation of the desired data on the first surface, cause the desired data to be displayed on the second surface.

16. The wearable terminal apparatus according to claim 1, further comprising:
audio data acquisition means for acquiring audio data from voice emitted by the user, wherein
the at least one circuitry is configured to:
convert the audio data acquired by the audio data acquisition means into text data; and
cause the text data to be displayed as the second image on the second surface.

17. The wearable terminal apparatus according to claim 1, further comprising:
audio data acquisition means for acquiring audio data from voice emitted by the user, wherein
the at least one circuitry is configured to:
translate the audio data into text data in a predetermined language, based on the audio data acquired by the audio data acquisition means; and
cause the translated text data to be displayed as the second image on the second surface.

18. The wearable terminal apparatus according to claim 11, wherein the at least one circuitry is configured to
cause the second image displayed on the second surface of the virtual image to be displayed on the first surface of the virtual image in response to a user operation.

19. A non-transitory computer-readable storage medium storing a program for causing a computer provided in a wearable terminal apparatus to be worn by a user for use to perform a process, the process comprising:
causing a display unit to display a virtual image of a polyhedron located in a space;
causing a first image having first information to be displayed on a first surface of the polyhedron and causing a second image having second information to be displayed on a second surface of the polyhedron; and
disabling an operation of rotating the virtual image in response to a user operation when the first image is displayed on the first surface and the second image is displayed on the second surface.

20. A display method for a wearable terminal apparatus to be worn by a user for use, comprising:
causing a display unit to display a virtual image of a polyhedron located in a space;
causing a first image having first information to be displayed on a first surface of the polyhedron and causing a second image having second information to be displayed on a second surface of the polyhedron; and
disabling an operation of rotating the virtual image in response to a user operation when the first image is displayed on the first surface and the second image is displayed on the second surface.

21. A virtual image distribution system comprising:
one wearable terminal apparatus to be worn by one user for use;
another wearable terminal apparatus to be worn by another user for use; and
a management apparatus configured to manage the one wearable terminal apparatus and the another wearable terminal apparatus, wherein
the management apparatus comprises at least one circuitry, and
the at least one circuitry is configured to:
cause a display unit of the one wearable terminal apparatus and a display unit of the another wearable terminal apparatus to display a virtual image of a polyhedron located in a space shared by the one user and the another user;
cause an image visually recognizable by the one user in the one wearable terminal apparatus to be displayed on a first surface of the polyhedron;
cause an image visually recognizable by the another user in the another wearable terminal apparatus to be displayed on a second surface of the polyhedron; and
disable an operation of rotating the virtual image in response to a user operation when the first image is displayed on the first surface and the second image is displayed on the second surface.

* * * * *